A. GEORG.
Device for Attaching Seals to Pipe-Joints in Distilleries.

No. 210,198. Patented Nov. 26, 1878.

Attest:
Warren Seely.
James T. Payne

Inventor:
Adolph Georg
by Geo. W. Dyer & Co.
Atty

UNITED STATES PATENT OFFICE.

ADOLPH GEORG, OF CHICAGO, ILLINOIS.

IMPROVEMENT IN DEVICES FOR ATTACHING SEALS TO PIPE-JOINTS IN DISTILLERIES.

Specification forming part of Letters Patent No. 210,198, dated November 26, 1878; application filed January 17, 1878.

*To all whom it may concern:*

Be it known that I, ADOLPH GEORG, of Chicago, in the county of Cook and State of Illinois, have invented a new and Improved Device for Attaching Seals to Pipe-Joints in Distilleries, as fully set forth in the following specification.

The nature of my invention relates to devices for attaching seals to jointed parts in distilleries or in other establishments of a similar nature, so that these jointed parts thus sealed cannot be uncoupled or disconnected without breaking or damaging the seal or the fixtures by means of which it is attached.

My invention therein consists in providing the ends of the pipes and the coupling forming a joint with eyebolts, one or more of such eyebolts being secured to each part, and tying or connecting these eyebolts by means of a doubled wire, the ends of which are brought together and embedded in a seal.

Figure 1:
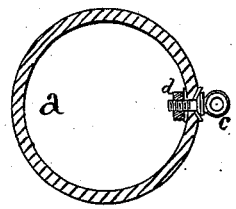
Figure 2:
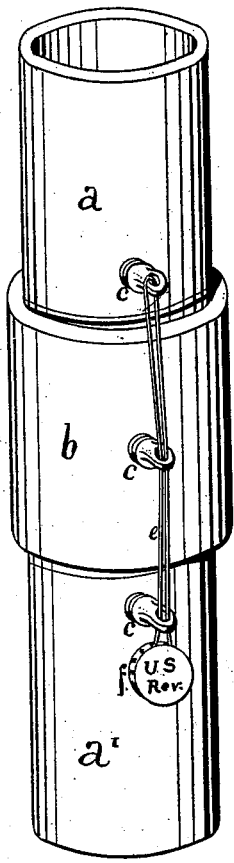

In the drawing, Figure 1 is a cross-section of a pipe with an eyebolt affixed, and Fig. 2 is a perspective view of two pipe ends coupled, with seal attached.

$a$ and $a'$ are two pipe ends, connected together by a pipe-coupling, $b$. $c\,c\,c$ are three eyebolts, having conical shoulders to fit into countersunk holes in said pipe ends and coupling, and a screw-threaded shank, with nut $d$, for securing the same to the pipes. The conical shoulders of the said eyebolts are seated upon leather or rubber washers; and similar washers are placed under the nuts $d$ for preventing leakage.

$e$ is a wire, which is strung around and through the eyelets of the bolts $c$, and the ends of which are embedded in a seal, $f$, of lead, which is to be put on by the revenue officer in charge.

In countries the revenue of the government of which partly depends upon a tax collected on the produce of alcohol and liquors it is very important that the government should be protected against fraud by proper precaution in having the distilleries and similar establishments under complete control: yet with every safeguard heretofore instituted there were chances for fraudulent operations by unscrupulous distillers. One which may have been frequently practiced is to incidentally disconnect or uncouple one or the other pipe, and to draw off the liquor from its regular course. My above-described improvement will put a stop to all this, since when applied no joint can be disconnected without detection by the revenue officer in charge.

I am aware that seals have been attached in distilleries before for a similar purpose, which I do not claim, broadly; but What I do claim is—

In a device for sealing pipe-joints in distilleries, the combination, with the pipe $a\,a'$ and coupling $b$, of the eyebolts $c$, attached to the said pipe and coupling, and the wire $e$, doubled and passed through the said eyebolts, and having its ends joined by a seal, $f$, all substantially as and for the purposes set forth.

ADOLPH GEORG.

Witnesses:
WM. H. LOTZ,
EMIL H. FROMMANN.